United States Patent [19]

Akagi et al.

[11] Patent Number: 5,593,731

[45] Date of Patent: Jan. 14, 1997

[54] AQUEOUS CURABLE RESIN COMPOSITIONS

[75] Inventors: Yuu Akagi, Yokohama; Yuichi Kawaguchi, Aichi-ken; Donghai Yu, Tokyo-to, all of Japan

[73] Assignee: Kansai Paint Company Limited, Amagasaki, Japan

[21] Appl. No.: 411,308

[22] Filed: Mar. 27, 1995

[30] Foreign Application Priority Data

Mar. 30, 1994 [JP] Japan .................................. 6-061364
Dec. 8, 1994 [JP] Japan .................................. 6-304521

[51] Int. Cl.$^6$ ............................................. B05D 3/02
[52] U.S. Cl. ..................... 427/386; 427/387; 523/410; 523/411; 523/414
[58] Field of Search ............................ 523/410, 411, 523/414; 427/386, 387

[56] References Cited

U.S. PATENT DOCUMENTS 5,069,767 12/1991 Tominaga .......................... 204/181.7

Primary Examiner—Melvyn I. Marquis
Assistant Examiner—D. Aylward
Attorney, Agent, or Firm—Armstrong, Westerman, Hattori, McLeland & Naughton

[57] ABSTRACT

The present invention provides an aqueous curable resin composition which comprises: [A] a resin component containing, as functional groups, a specific aprotic onium salt-containing group, a hydroxyl group, an epoxy group, and a hydrolyzable group directly bound to a silicon atom or a hydroxysilyl group, and [B] a metal chelate compound selected from aluminum chelate compound, zirconium chelate compound and titanium chelate compound. The composition of the present invention is an aqueous composition which has an excellent storage stability and good curability and is capable of giving a cured product having a high water resistance.

11 Claims, No Drawings

AQUEOUS CURABLE RESIN COMPOSITIONS

The present invention relates to novel aqueous curable resin compositions.

Organic solvent type curable compositions which comprise, as a resin component, a polymer containing a hydroxysilyl or alkoxysilyl group, epoxy group and hydroxyl group, and, as a curing agent, a metal chelate compound are now used in the fields of topcoating compositions for automotive outer plates and coating compositions for buildings. Such compositions, when used as a thermosetting coating composition, reportedly exhibit an excellent low temperature curability and can provide a coating film which is excellent in finishing appearance and performance characteristics (acid resistance, scratch resistance, etc.), compared with conventional coating compositions comprising a melamine resin as a curing agent (Japanese Unexamined Patent Publication No. 233752/1990). On the other hand, recently there has been an increasing need for aqueous coating Compositions from the viewpoint of alleviation of environmental pollution, it is earnestly desired to provide aqueous coating compositions based on said curable coating compositions.

However, when the curable composition disclosed in the above publication is made aqueous, the following problems arise. When an anionic polar group is introduced into the above resin component as a water-dispersible group, the polar group reacts with the epoxy group in the curable composition. A cationic polar group introduced into the resin component results in the inhibition of curing of the composition, whereas a nonionic polar group such as an ether group or hydroxyl group introduced therein provides a coating with problems such as low water resistance. Therefore, it has been considered very difficult to render said curable composition aqueous and free from these problems.

An object of the present invention is to provide a novel aqueous curable resin composition which can overcome the above problems.

Another object of the present invention is to provide a novel aqueous curable resin composition which is excellent in storage stability and low temperature curability and capable of forming a coating film having an excellent water resistance.

These and other objects of the present invention will become more apparent from the following description.

The present invention provides an aqueous curable resin composition which comprises:

[A] a resin component containing, as functional groups, an aprotic onium salt-containing group represented by the formula $$-\underset{\underset{OH}{|}}{\overset{\overset{R}{|}}{C}}-CH_2-W^+\cdot{}^-OCR^1 \quad (1)$$
$$\qquad\qquad\qquad\quad \overset{\|}{O}$$

wherein R is a hydrogen atom or a methyl group, $R^1$ is a hydrogen atom or a hydrocarbon group having 1 to 8 carbon atoms which may be substituted by a hydroxyl group, an alkoxyl group, an ester group or a halogen atom and $W^+$ represents

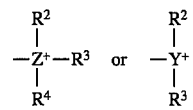

wherein Z is a nitrogen atom or a phosphorus atom, Y is a sulfur atom and $R^2$, $R^3$ and $R^4$ are the same or different and each represents an organic group having 1 to 14 carbon atoms, or $R^2$ and $R^3$, or $R^2$, $R^3$ and $R^4$ may combine to form a heterocyclic group together with the nitrogen atom, phosphorus atom or sulfur atom, a hydroxyl group, an epoxy group, and a hydrolyzable group directly bound to a silicon atom or a hydroxysilyl group, and

[B] a metal chelate compound selected from the class consisting of aluminum chelate compound, zirconium chelate compound and titanium chelate compound.

The present invention also provides a method for forming a cured coating, the method comprising the steps of applying to a substrate said aqueous curable resin composition, and heating the coating at 120° C. to 200° C. for curing.

The present inventors conducted extensive researches to solve the above problems and found that when the specific aprotic onium salt-containing group is introduced into the resin component of said conventional curable composition, the resin component can be suitably made aqueous, and the obtained composition has a good storage stability, retains the low temperature curability and is capable of forming a coating film having an excellent water resistance. Based on these findings, the present invention has been accomplished.

Preferable examples of the resin component [A] of the present invention are:

the resin component [A] which is a resin (A-1) having in a molecule the aprotic onium salt-containing group represented by the formula (1), a hydroxyl group, an epoxy group and a hydrolyzable group directly bound to a silicon atom or a hydroxysilyl group, the resin component [A] which is a mixture of a resin or compound (A-2) having in a molecule a hydroxyl group and a hydrolyzable group directly bound to a silicon atom or a hydroxysilyl group and a resin or compound (A-3) having an epoxy group in a molecule, at least one of (A-2) and (A-3) being a resin or compound having the aprotic onium salt-containing group represented by the formula (1), the resin component [A] which is a mixture of a resin or compound (A-4) having in a molecule an epoxy group and a hydrolyzable group directly bound to a silicon atom or a hydroxysilyl group and a resin or compound (A-5) having a hydroxyl group in a molecule, at least one of (A-4) and (A-5) being a resin or compound having the aprotic onium salt-containing group represented by the formula (1), the resin component [A] which is a mixture of a resin or compound (A-6) having in a molecule a hydrolyzable group directly bound to a silicon atom or a hydroxysilyl group and a resin or compound (A-7) having in a molecule a hydroxyl group and an epoxy group, at least one of (A-6) and (A-7) being a resin or compound having the aprotic onium salt-containing group represented by the formula (1), the resin component [A] which is a mixture of a resin or compound (A-6) having in a molecule a hydrolyzable group directly bound to a silicon atom or hydroxysilyl group, a resin or compound (A-3) having an epoxy group in a molecule and a resin or compound (A-5) having a hydroxyl group in a molecule, at least one of (A-6), (A-3) and (A-5) being a resin or compound having the aprotic onium salt-containing group represented by the formula (1), the resin component [A] containing, per kg thereof, 0.01 to 3.0 equivalents of the aprotic onium salt-containing group represented by the formula (1), 0.1 to 8.0 equivalents of hydroxyl group, 0.1 to 5.0 equivalents of epoxy group and 0.1 to 10 equivalents of hydrolyzable group directly bound to a silicon atom or hydroxysilyl group, the resin component [A] containing, per kg thereof, 0.1 to 1.5 equivalents of the aprotic onium salt-containing group represented by the formula (1), 0.5 to 2.5 equivalents of hydroxyl group, 0.5 to 2.5 equivalents of epoxy group and 0.1 to 1.0 equivalent of hydrolyzable group directly bound to a silicon atom or hydroxysilyl group, the resin component [A] wherein the epoxy group is an alicyclic epoxy group, and the resin component [A] wherein the aprotic onium salt-containing group of the formula (1) is a group obtained by reacting 1,2-epoxy group, one of tertiary amine, phosphine and thioether, and an organic acid.

The aprotic onium salt-containing group in the resin component [A] is represented by the formula (1), and the carbon atom in the β-position from the nitrogen, phosphorus or sulfur atom of the onium salt is required to have a secondary or tertiary hydroxyl group. Further, the aprotic onium salt is a quaternary ammonium salt, a quaternary phosphonium salt or a tertiary sulfonium salt.

Specific examples of the cation in the aprotic onium salt-containing group are given below.

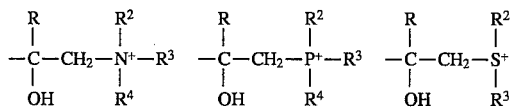

In the above formulas, R is a hydrogen atom or a methyl group, $R^2$, $R^3$ and $R^4$ are the same or different and each represents an organic group having 1 to 14 carbon atoms and $R^2$ and $R^3$, or $R^2$, $R^3$ and $R^4$ may combine to form a heterocyclic group together with the nitrogen atom, phosphorus atom or sulfur atom.

The organic groups represented by $R^2$, $R^3$ and $R^4$ are not limited specifically insofar as they do not substantially inhibit the ionization of the ammonium, phosphonium or sulfonium group. Examples thereof are hydrocarbon groups having 1 to 14 carbon atoms which may contain one or more heteroatoms such as an oxygen atom in the form of hydroxyl group, alkoxyl group or the like.

The hydrocarbon groups include, for example, aliphatic, alicyclic or aromatic hydrocarbon groups such as alkyl, cycloalkyl, cycloalkylalkyl, aryl, aralkyl and the like. The alkyl groups may be a straight- or branched-chain group and are preferably those having not more than 8 carbon atoms, more preferably lower groups. Examples are methyl, ethyl, n- or iso-propyl, n-, iso-, sec- or tert-butyl, pentyl, heptyl, octyl and the like. The cycloalkyl or cycloalkylalkyl groups are preferably those having 5 to 8 carbon atoms and include, for example, cyclopentyl, cyclohexyl, cyclohexylmethyl, cyclohexylethyl and the like. The aryl groups include phenyl, toluyl, xylyl and the like. As the aralkyl group, benzyl is suitably used.

Preferred examples of hydrocarbon groups containing a heteroatom such as an oxygen atom are hydroxyalkyl groups (preferably hydroxy-lower-alkyl groups), specifically hydroxymethyl, hydroxyethyl, hydroxybutyl, hydroxypentyl, hydroxyhexyl, hydroxyoctyl and the like, and alkoxyalkyl groups (preferably lower-alkoxy-lower-alkyl groups), specifically methoxymethyl, ethoxymethyl, n-propoxyethyl, iso-propoxymethyl, n-butoxymethyl, iso-butoxyethyl, tert-butoxyethyl and the like.

Given below are examples of -W⁺ wherein $R^2$ and $R^3$, or $R^2$, $R^3$ and $R^4$ combine to form a heterocyclic group together with the nitrogen atom, phosphorus atom or sulfur atom.

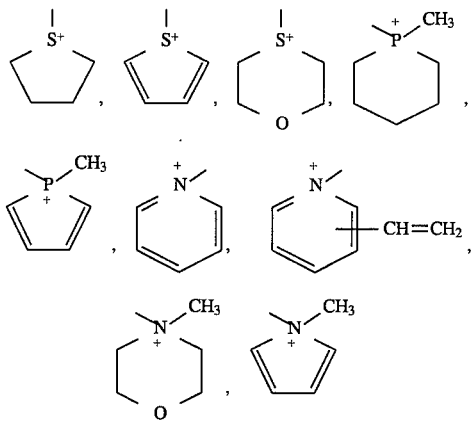

The anion in the aprotic onium salt is represented by the following formula:

wherein $R^1$ is a hydrogen atom or hydrocarbon group having 1 to 8 carbon atoms which may be substituted by a hydroxyl group, an alkoxyl group, an ester group or a halogen atom, and the anion is produced from an organic carboxylic acid.

Specific examples of $R^1$ are hydrogen, methyl, ethyl, n-propyl, isopropyl, n-butyl, t-butyl, monochloromethyl, monofluoromethyl, vinyl, 1-methylvinyl, monohydroxymethyl, 1-hydroxyethyl, 2-methylvinyl, 2-(methyloxycarbonyl)-vinyl, 1-(methyloxycarbonylmethyl)-vinyl and the like.

Various known organic carboxyl acids can be used insofar as they produce the above-mentioned anions. Specific examples are acetic acid, formic acid, trimethylacetic acid, acrylic acid, methacrylic acid, lactic acid, hydroxyacetic acid, crotonic acid, chloroacetic acid, maleic acid monomethyl ester, fumaric acid monoethyl ester, itaconic acid monomethyl ester and the like. Among them, those having a dissociation constant (pKa value) of not less than 1×10⁻⁵ are preferably used.

According to the present invention, the aprotic onium salt-containing group represented by the formula (1) functions as a polar group for stably dispersing or dissolving the resin component [A] in an aqueous solvent. The group does not react with the epoxy group and therefore does not impair the storage stability, and it is thermally decomposed during heating for drying and thus neither inhibits the curing reaction nor remains in the cured coating. Hence the water resistance and like performance characteristics of the coating film are not impaired.

The hydrolyzable group directly bound to a silicon atom contained in the resin component of the curable resin composition of the present invention is decomposed in the presence of water to produce a hydroxysilyl group. Examples of such groups are alkoxysilyl, acyloxysilyl and the like. In the present specification, the hydrolyzable group and hydroxysilyl group are sometimes referred to as "reactive silicon group".

The resin component [A] in the curable resin composition of the present invention contains a resin having an aprotic onium salt-containing group. The component [A] contains the aprotic onium salt-containing group represented by the formula (1), a hydroxyl group, an epoxy group and a reactive silicon group.

The resin component [A] for use in the present invention may be a resin having in a molecule the aprotic onium salt-containing group, a hydroxyl group, an epoxy group and a reactive silicon group, or may be a mixture of two or more resins or a mixture of at least one resin and at least one compound. In this case, the mixture may have a hydroxyl group, an epoxy group and a reactive silicon group, and at least one resin or compound in the mixture may have the aprotic onium salt-containing group.

If the resin component [A] is one resin, a mixture of two or more resins or a mixture of at least one resin and at least one compound, the amounts of the groups contained in said component are preferably in the following range per kilogram of the resin component [A], in view of reactivity, storage stability and performance characteristics (such as water resistance) of the obtained cured product.

Hydroxyl group: 0.1 to 8.0 equivalents/kg, more preferably 0.5 to 2.5 equivalents/kg Epoxy group: 0.1 to 5.0 equivalents/kg, more preferably 0.5 to 2.5 equivalents/kg Reactive silicon group: 0.1 to 10 equivalents/kg, more preferably 0.1 to 1.0 equivalent/kg Aprotic onium salt-containing group: 0.01 to 3.0 equivalents/kg, more preferably 0.1 to 1.5 equivalents/kg When the resin component [A] is a resin containing in a molecule the aprotic onium salt-containing group, a hydroxyl group, an epoxy group and a reactive silicon group (hereinafter sometimes briefly referred to as "resin (A-1)"), the resin (A-1) includes, for example, a resin obtained by radically polymerizing a polymerizable unsaturated monomer having a reactive silicon group (hereinafter sometimes briefly referred to as "monomer (a)"), an epoxy group-containing polymerizable unsaturated monomer (hereinafter sometimes briefly referred to as "monomer (b)"), a hydroxyl group-containing polymerizable unsaturated monomer (hereinafter sometimes briefly referred to as "monomer (c)"), a polymerizable unsaturated monomer having an aprotic onium salt-producing group such as 1,2-epoxy group, 2-halogeno-1-hydroxyethyl group or the like for the reaction for the production of onium salt (hereinafter sometimes briefly referred to as "monomer (d)"), and optionally a polymerizable unsaturated monomer other than the above monomers (a), (b), (c) and (d) (hereinafter sometimes briefly referred to as "monomer (e)") to obtain a copolymer, and reacting the aprotic onium-producing group in the copolymer to form an aprotic onium salt.

Preferably used as the monomer (a) are a silane compound represented by the formula (2):

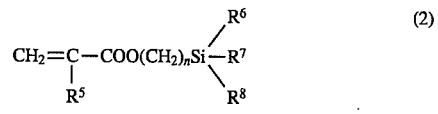

wherein $R^5$ is a hydrogen atom or methyl group, $R^6$, $R^7$ and $R^8$ each represents a hydroxyl group, an alkoxyl group having 1 to 4 carbon atoms or an aliphatic hydrocarbon group having 1 to 8 carbon atoms, provided that all of $R^6$, $R^7$ and $R^8$ are not aliphatic hydrocarbon groups having 1 to 8 carbon atoms, and n is an integer of 1 to 6, a reaction product of said silane compound and a trialkoxysilane compound such as methyltrimethoxysilane or a trihydroxysilane compound (for example, the polysiloxane macromonomer disclosed in U.S. Pat. No. 5,051,473) and the like.

Specific examples of $R^6$, $R^7$ and $R^8$ are hydroxyl, methoxy, ethoxy, propoxy, isopropoxy, butoxy, t-butoxy, methyl, ethyl, n-propyl, isopropyl, n-butyl, isobutyl, t-butyl, n-hexyl, isohexyl, n-octyl, 2-ethylhexyl and the like.

Examples of the above silane compound are γ-methacryloxypropyltrimethoxysilane, γ-methacryloxypropyltriethoxysilane, γ-acryloxypropyltrimethoxysilane, γ-methacryloxybutyltriethoxysilane, γ-acryloxypropyltrisilanol and the like. Among them, γ-methacryfoxypropyltrimethoxysilane, γ-methacryloxypropyltriethoxysilane, γ-acryloxypropyltrisilanol and the like are especially preferable. These compounds can be used singly or in combination.

Preferably used as the monomer (b) is a polymerizable unsaturated monomer having an alicyclic epoxy group in view of the curability of the resulting resin. For example, the vinyl monomers having the alicyclic epoxy groups represented by the following formulas (4) to (18) which are disclosed in U.S. Pat. No. 5,051,473 are also usable.

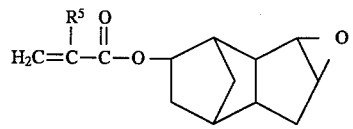 (4)

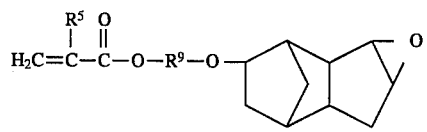 (5)

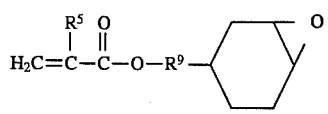 (6)

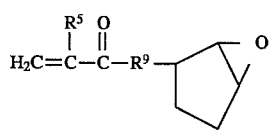 (7)

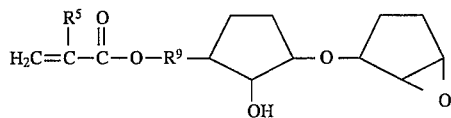
(8)

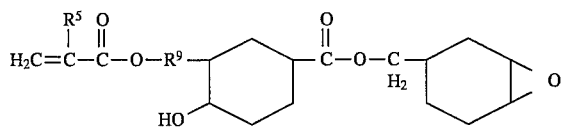
(9)

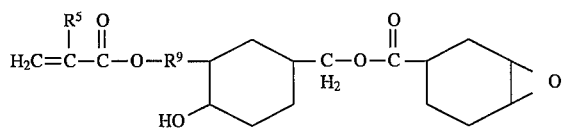
(10)

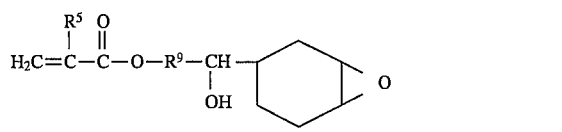
(11)

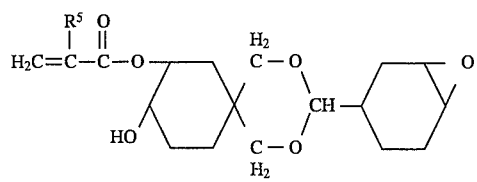
(12)

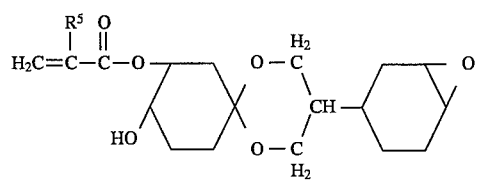
(13)

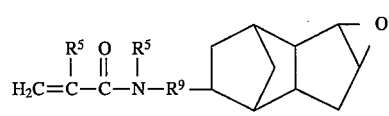
(14)

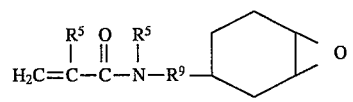
(15)

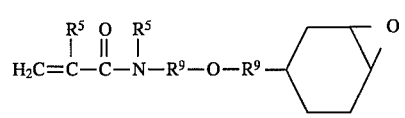
(16)

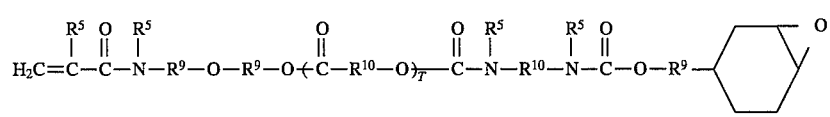
(17)

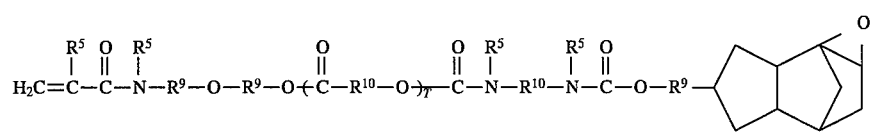
(18)

In the above formulas, $R^5$ is as defined-above, $R^9$ is a divalent aliphatic saturated hydrocarbon group having 1 to 6 carbon atoms, $R^{10}$ is a divalent hydrocarbon groups having 1 to 10 carbon atoms and T is an integer of 0 to 10.

Specific examples of $R^9$ are methylene, 1,2-ethylene, 1,3-propylene, 1,2-propylene, 1,4-butylene, 1,3-butylene, 1,2-butylene, 2-methyl-1,3-propylene, 1-methyl-1,3-propylene, pentylene, 1,6-hexylene, 2-ethyl-1,4-butylene, 1,2-, 1,3- or 1,4-cyclohexylene and the like. Specific examples of $R^{10}$ include, in addition to the groups exemplified for $R^9$, 1,8-octylene, 2-ethyl-1,6-hexylene, o-, m- or p-phenylene and the like.

The monomer (c) includes, for example, $C_{2-8}$ hydroxyalkyl esters of acrylic acid or methacylic acid such as hydroxyethyl acrylate, hydroxyethyl methacrylate, hydroxypropyl acrylate, hydroxypropyl methacrylate, hydroxybutyl methacrylate, hydroxybutyl acrylate, etc.; adducts of a hydroxyalkyl ester of acrylic acid or methacrylic acid with ε-caprolacton, such as monomers named Placcel FA-1, FA-2, FA-3, FM-1, FM-2 and FM-3 (trade marks, products of DAICEL CHEMICAL INDUSTRIES); polyalkylene glycol mono(meth)acrylates, hydroxyalkyl vinyl ethers, etc.

Among the examples of the monomer (d), monomers having 1,2-epoxy group for the reaction for the production of onium salt include, for example, polymerizable unsaturated monomers having a glycidyl group or methylglycidyl group such as glycidyl acrylate, glycidyl methacrylate, diglycidyl fumarate, methylglycidyl (meth)acrylate, ε-caprolacton-modified glycidyl (meth)acrylate, etc. Alicyclic epoxy groups are not suitable as the monomer (d) since they are not readily made into an onium salt. Monomers having a 2-halogeno-1-hydroxyethyl group for use as the monomer (d) include, for example, 2-chloro-1-hydroxyethyl(meth)acrylate, di(2-chloro-1-hydroxyethyl)fumarate, etc.

The monomer (e) can be selected from a wide range according to desired performance characteristics of the resulting copolymer. Typical examples thereof are as follows.

(a) Esters of acrylic acid or methacrylic acid: for example, $C_{1-18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate, etc.; $C_{2-18}$ alkoxyalkyl esters of acrylic acid or methacrylic acid such as methoxybutyl acrylate, methoxybutyl methacrylate, methoxyethyl acrylate, methoxyethyl methacrylate, ethoxybutyl acrylate, ethoxybutyl methacrylate, etc.; cycloalkyl esters of acrylic acid or methacrylic acid such as cyclohexyl acrylate, cyclohexyl methacrylate, etc.

(b) Vinyl aromatic compounds: for example, styrene, α-methylstyrene, vinyltoluene, p-chlorostyrene, etc.

(c) $C_{1-20}$ perfluoroalkyl esters of acrylic acid or methacrylic acid such as perfluorobutylethyl (meth)acrylate, perfluoroisononyl ethyl (meth)acrylate, perfluorooctyl ethyl (meth)acrylate, etc.; acrylonitrile and methacrylonitrile; olefins such as ethylene, propylene, butadiene, isoprene, chloroprene, etc.; fluoroolefins such as trifluoroethylene, tetrafluoroethylene, vinylidene fluoride, etc.; vinyl esters and propenyl esters such as vinyl acetate, vinyl propionate, vinyl caprate, VEOVA MONOMER (product of Shell Chemical Co., Ltd.), isopropenyl acetate, etc.; vinyl ethers such as ethyl vinyl ether, n-propyl vinyl ether, isopropyl vinyl ether, butyl vinyl ether, octyl vinyl ether, cyclohexyl vinyl ether, phenyl vinyl ether, benzyl vinyl ether, etc.

When the resin component [A] is a mixture of two or more resins or a mixture of at least one resin and at least one compound, combinations of the resin(s) and compound(s) include, for example, the following.

(i) Combination of a resin or a compound having a hydroxyl group and a reactive silicon group in a molecule (hereinafter sometimes briefly referred to as "resin or compound (A-2)"), and a resin or a compound having an epoxy group in a molecule (hereinafter sometimes briefly referred to as "resin or compound (A-3)"), at least one of (A-2) and (A-3) being a resin or a compound having the aprotic onium salt-containing group represented by the formula (1).

(ii) Combination of a resin or a compound having an epoxy group and a reactive silicon group in a molecule (hereinafter sometimes briefly referred to as "resin or compound (A-4)") and a resin or a compound having a hydroxyl group in a molecule (hereinafter sometimes briefly referred to as "resin or compound (A-5)"), at least one of (A-4) and (A-5) being a resin or a compound having the aprotic onium salt-containing group represented by the formula (1).

(iii) Combination of a resin or a compound having a reactive silicon group in a molecule (hereinafter sometimes briefly referred to as "resin or compound (A-6)") and a resin or a compound having a hydroxyl group and an epoxy group in a molecule (hereinafter sometimes briefly referred to as "resin or compound (A-7)"), at least one of (A-6) and (A-7) being a resin or a compound having the aprotic onium salt-containing group represented by the formula (1).

(iv) Combination of the resin or the compound (A-6), the resin or the compound (A-3) and the resin or the compound (A-5), at least one of (A-6), (A-3) and (A-5) being a resin or a compound having the aprotic onium salt-containing group represented by the formula (1).

Among the resins and the compounds (A-2), (A-3), (A-4), (A-5), (A-6) and (A-7), the resins can be prepared by, for example, copolymerizing a monomer mixture of polymerizable unsaturated monomers having or capable of producing the required groups and selected from the above-mentioned monomers (a) to (d) optionally together with the monomer (e). When the monomer (d) is used as a monomer component, the aprotic onium salt-producing group in the copolymer is converted into an aprotic onium salt to obtain the resin.

For example, the resin (A-2) can be obtained by copolymerizing a monomer mixture of the monomers (a) and (c), optionally together with the monomer (e). For dispersing or dissolving the resin (A-2) in an aqueous solvent, the monomer (d) is copolymerized and the copolymer is reacted to convert the aprotic onium salt-producing group in the copolymer to an aprotic onium salt.

Examples of the resin or the compound (A-2) include, in addition to the resins mentioned above, the compounds represented by the following formulas.

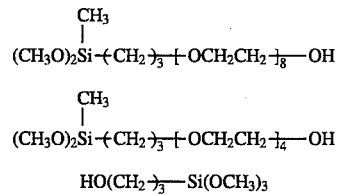

Examples of the resin or the compound (A-3) include, in addition to the resin obtained by copolymerizing the monomer (b) and optionally the monomer(s) (d) and/or (e), and subjecting the copolymer to the onium salt-producing reaction when necessary, the compounds or the like represented by the following formulas (19) to (23):

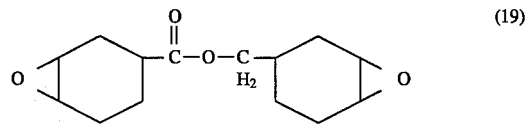

(19)

(20)

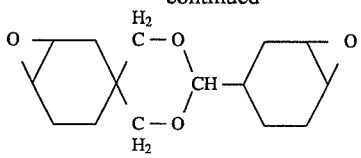

(21)

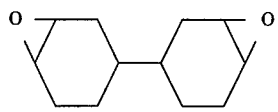

(22)

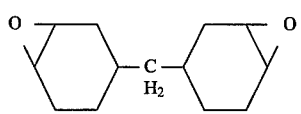

(23)

adducts of a compound having an alicyclic epoxy group and hydroxyl group directly bound to a carbon atom, such as a compound represented by the formula (24):

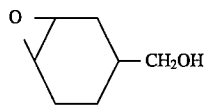

(24)

with a polyisocyanate compound (usable polyisocyanate compounds are, for example, organic diisocyanates such as aliphatic diisocyanates, e.g., hexamethylene diisocyanate, trimethylhexamethylene diisocyanate, etc.; alicyclic diisocyanates, e.g., hydrogenated xylylene diisocyanate, isophorone diisocyanate, etc.; aromatic diisocyanates, e.g., tolylene diisocyanate, 4,4'-diphenylmethane diisocyanate, etc., or adducts of such an organic diisocyanate with a polyhydric alcohol, low molecular weight polyester resin, water or the like, a polymer of said respective organic diisocyanates with each other, isocyanate-biuret and the like, representative commercial products being Burnock D-750, -800, DN-950, -970 and 15-455 (products of Dainippon Ink & Chemicals, Inc.), Desmodur L, NHL, IL and N3360 (products of Bayer A.G., Germany), Takenate D-102, -202, -110N and -123N (products of Takeda Chemical Industries, Ltd.), Coronate L, HL, EH and 203 (products of Nippon Polyurethane Industries, Co., Ltd.) and Duranate 24A-90CX (product of Asahi Chemical Industries, Ltd.)); adducts of the compound represented by the above formula (19) with a polybasic acid; the compounds obtained by oxidizing an ester containing in a molecule an unsaturated group such as

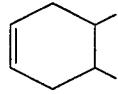

(e.g., esters obtained by esterifying tetrahydrophthalic anhydride, trimethylolpropane, 1,4-butanediol, etc. and having a number average molecular weight of 900) with peracetic acid or the like.

In addition to the above compounds containing an alicyclic oxirane group, compounds having a non-alicyclic oxirane group, such as diglycidyl ether, 2-glycidylphenyl glycidyl ether, etc., can also be used.

Examples of the resin or the compound (A-4) include, in addition to the resin obtained by copolymerizing the monomers (a) and (b) and optionally the monomer(s) (d) and/or (e), and subjecting the obtained copolymer to onium salt-producing reaction when necessary, the compounds represented by the following formulas (25) to (27).

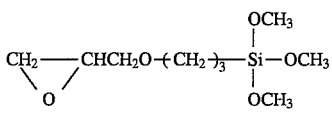

(25)

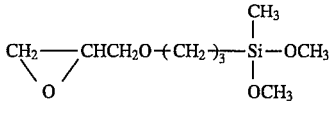

(26)

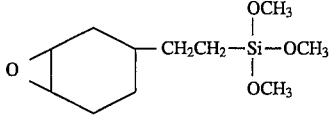

(27)

Examples of the resin or the compound (A-5) include, in addition to the resin obtained by copolymerizing the monomer (c) and optionally the monomer(s) (d) and/or (e), and subjecting the obtained copolymer to onium salt-producing reaction when necessary, polyhydric alcohols such as ethylene glycol, propylene glycol, glycerine, pentaerythritol, etc.; polyether polyols such as polyethylene glycol, polypropylene glycol, etc.; and polyester polyols, polyvinyl alcohols, etc.

Examples of the resin or the compound (A-6) include, in addition to the resin obtained by copolymerizing the monomer (a) and optionally the monomer(s) (d) and/or (e), and subjecting the obtained copolymer to onium salt-producing reaction when necessary, the silane compound represented by the following formula (28):

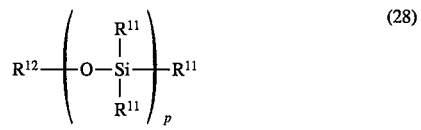

(28)

(wherein the groups $R^{11}$ are the same or different and each represents an alkyl or an alkoxyl group having 1 to 15 carbon atoms, a hydroxyl group or a phenyl group, $R^{12}$ is an alkyl group having 1 to 5 carbon atoms or a hydrogen atom, provided that at least one of the groups $R^{11}$ is an alkoxyl group or a hydroxyl group, and p is an integer of 1 to 5).

Specific examples of $R^{11}$ include, in addition to the groups exemplified for $R^6$, $R^7$ and $R^8$, decyl lauryl, phenyl and the like. Specific examples of $R^{12}$ are hydrogen, methyl, ethyl, n-propyl, isopropyl, n-butyl, isobutyl, t-butyl, pentyl and the like.

Specific examples of silane compounds include monosilane compounds such as triphenylsilanol, diphenylsilanediol, diphenyldimethoxysilane, phenyltrimethoxysilane, phenethyltrimethoxysilane, diphenyldiethoxysilane, etc., and partial condensation products of these monosilane compounds.

Further, the compound (A-6) includes, for example, the polysiloxane macromonomers disclosed in the above-mentioned U.S. Pat. No. 5,051,473.

Examples of the resin or the compound (A-7) include, in addition to the resin obtained by copolymerizing the monomers (b) and (c) and optionally the monomer(s) (d) and/or (e), and subjecting the obtained copolymer to onium salt-producing reaction when necessary, epoxy resins having a hydroxyl group such as EPIKOTE 834, 1001 and 1004 (epoxy resins manufactured by Shell Chemical Co., Ltd.); 2,3-epoxy-2-ethylhexanol, glycerine diglycidyl ether, diglycerine triglycidyl ether, glycidol, etc.

Further, the resin or the compound (A-2) includes the resin (A-1).

The resin or the compound (A-3) includes the resin (A-1), the resin or the compound (A-4) and the resin or the compound (A-7).

The resin or the compound (A-4) includes the resin (A-1).

The resin or the compound (A-5) includes the resin (A-1), the resin or the compound (A-2) and the resin or the compound (A-7).

The resin or the compound (A-6) includes the resin (A-1), the resin or the compound (A-2) and the resin or the compound (A-4).

The resin or the compound (A-7) includes the resin (A-1).

In preparing the resin component [A], the onium salt-containing group can be introduced into the resin by the following method (a) or (b).

A method (a) comprises reacting a resin having 2-halogeno-1-hydroxyethyl group with tertiary amine, phosphine or thioether in a water-miscible inactive organic solvent, substituting a hydroxyl group for the halogen atom by anion exchange, and then reacting the obtained product with an organic acid.

For example, when tertiary amine is used as the compound to be reacted with the resin, the method (a) is represented by the following reaction formula:

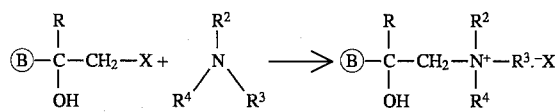

wherein B is the base portion of the resin, X is a halogen atom and R, $R^2$, $R^3$ and $R^4$ are as defined above.

When phosphine is used instead of tertiary amine, N is replaced by P in the above reaction formula, and when thioether is used instead of tertiary amine, N is replaced by S and -$R^4$ is deleted in the above reaction formula.

The reaction between the resin and the tertiary amine or the like is conducted with heating at about 100° to about 150° C. and is complete in about 1 to about 20 hours.

A hydroxyl group can be substituted for the halogen atom in the obtained product by, for example, bringing the resin to be treated into contact with beads of anion exchange resin. The resin having hydroxyl groups as substituents easily forms an onium salt-containing group merely by mixing with an organic acid at room temperature.

A method (b) comprises reacting a resin having 1,2-epoxy group with tertiary amine, phosphine or thioether and with an organic acid simultaneously in a water-miscible inactive organic solvent.

For example, when tertiary amine is used as the compound to be reacted with the resin, the method (b) is represented by the following reaction formula:

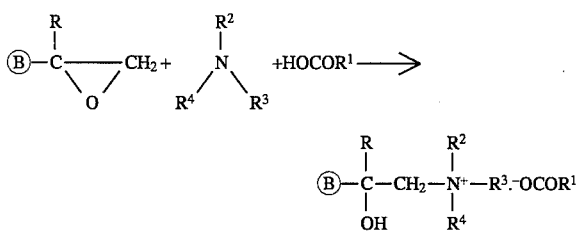

wherein R, $R^1$, $R^2$, $R^3$, $R^4$ and B are as defined above.

As in the method (a), when phosphine is used instead of tertiary amine, N is replaced by P in the above reaction formula, and when thioether is used instead of tertiary amine N is replaced by S and -$R^4$ is deleted in the above reaction formula.

The reaction between the resin, the tertiary amine or the like and the organic acid is conducted with heating at about 40° to about 80° C. and is complete in about 1 to about 20 hours.

The water-miscible inactive organic solvent for use in the methods (a) and (b) includes, for example, ether solvents such as ethylene glycol monobutyl ether, ethylene glycol monoethyl ether, ethylene glycol monomethyl ether acetate, etc., and alcohol solvents such as ethanol, propanol, butanol, etc.

According to the present invention, the resin component [A] containing a resin having an aprotic onium salt introduced thereto can be dissolved or dispersed in water by the function of the aprotic onium salt. Specifically stated, a stable aqueous solution or dispersion can be obtained by adding water to the resin component [A] containing a resin solution obtained using a water-miscible solvent for preparing the aprotic onium salt-containing resin, or adding said resin component [A] to water.

It is preferable that the particle size of the emulsion particles in the aqueous dispersion be within the range of about 50 to about 350 nm in view of the storage stability and finishing characteristics of the coating.

In the present invention, the component [B], i.e., a metal chelate compound selected from the class consisting of aluminum chelate compound, zirconium chelate compound and titanium chelate compound, serves as a crosslinking agent for the resin component [A].

The metal chelate compound for use as the component [B] is preferably a chelate compound containing a compound which shows keto-enol tautomerism as a ligand forming a stable chelate ring.

Usable as the compound which shows keto-enol tautomerism are, for example, β-diketones (e.g., acetylacetone), acetoacetic acid esters (e.g., methyl acetoacetate), malonic acid esters (e.g., ethyl malonate), ketones having a hydroxyl group in the β-position (e.g., diacetone alcohol), aldehydes having a hydroxyl group in the β-position (e.g., salicylaldehyde), esters having a hydroxyl group in the β-position (e.g., methyl salicylate) and the like. In particular, a good result can be obtained by use of acetoacetic esters and β-diketones.

The aluminum chelate compound can be suitably prepared, for example by mixing one mole of an aluminum alcoholate represented by the formula (29):

wherein the groups $R^{13}$ are the same or different and each represents an alkyl group having 1 to 20 carbon atoms or alkenyl group, with about 1 to 3 moles of said compound which shows keto-enol tautomerism, with heating when necessary.

The alkyl group having 1 to 20 carbon atoms which is represented by $R^{13}$ includes, for example, methyl, ethyl, n-propyl, iso-propyl, n-butyl, iso-butyl, sec-butyl, tert-butyl, pentyl, hexyl, heptyl, octyl, nonyl, decyl, undecyl, dodecyl, tridecyl, tetradecyl, octadecyl and the like. The alkenyl group includes vinyl, allyl and the like.

Examples of the aluminum alcholate represented by the formula (29) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide and the like. Among them, aluminum triisopropoxide, aluminum tri-sec-butoxide, aluminum tri-n-butoxide are particularly preferable.

The titanium chelate compound can be suitably prepared, for example by mixing one mole of titanium present in a titanate compound of the formula (30):

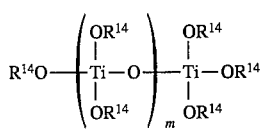

(30)

wherein m is an integer of 0 to 10, the groups $R^{14}$ are the same or different and each represents an alkyl group having 1 to 20 carbon atoms or an alkenyl group, with 1 to 4 moles of said compound which shows keto-enol tautomerism, with heating when necessary. Examples of the alkyl group having 1 to 20 carbon atoms and the alkenyl group which are represented by $R^{14}$ includes those exemplified for $R^{13}$.

Examples of the titanate represented by the formula (30) wherein m is 0 are tetramethyl titanate, tetraethyl titanate, tetra-n-propyl titanate, tetraisopropyl titanate, tetra-n-butyl titanate, tetraisobutyl titanate, tetra-tert-butyltitanate, tetra-n-pentyl titanate, tetra-n-hexyl titanate, tetraisooctyl titanate, tetra-n-lauryl titanate and the like. Among them, tetraisopropyl titanate, tetra-n-butyl titanate, tetraisobutyl titanate, tetra-tert-butyl titanate and the like provide good results. Among the titanates wherein m is 1 or more, dimers to undecamers (m in the formula (30) is 1 to 10) of tetraisopropyl titanate, tetra-n-butyl titanate, tetraisobutyl titanate and tetra-tert-butyltitanate give good results.

The zirconium chelate compound can be suitably prepared, for example, by mixing one mole of zirconium present in a zirconate of the formula (31):

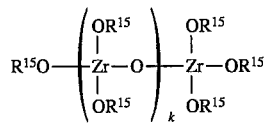

(31)

wherein k is an integer of 0 to 10, the groups $R^{15}$ are the same or different and each represents an alkyl group having 1 to 20 carbon atoms or an alkenyl group with about 1 to 4 moles of the compound which shows keto-enol tautomerism, with heating when necessary. Examples of the alkyl group having 1 to 20 carbon atoms and the alkenyl group which are represented by $R^{15}$ include those exemplified for $R^{13}$.

Examples of the zirconate represented by the formula (31) wherein k is 0 are tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate and the like. Among them, tetraisopropyl zirconate, tetra-n-propyl zirconate, tetraisobutyl zirconate, tetra-n-butyl zirconate, tetra-sec-butyl zirconate, tetra-tert-butyl zirconate and the like provide good results. Among the zirconates wherein k is 1 or more, dimers to undecamers (k in the formula (31) is 1 to 10) of tetraisopropyl zirconate, tetra-n-propyl zirconate, tetra-n-butyl zirconate, tetraisobutyl zirconate, tetra-sec-butyl zirconate and tetra-tert-butyl zirconate provide good results. The zirconium chelate compound may contain such zirconates associated with each other as a constituent unit.

Examples of preferred chelate compounds for use in the present invention are aluminum chelate compounds such as diisopropylate ethylacetoacetatoaluminum, tris(ethylacetoacetato)aluminum, tris(n-propylacetoacetato)aluminum, tris(isopropylacetoacetato)aluminum, tris(n-butylacetoacetato)aluminum, isopropoxybisethylacetoacetatoaluminum, diisopropoxyethylacetoacetatoaluminum, tris(acetylacetonato)aluminum, tris(ethylacetonato)aluminum, diisopropylate ethylacetonatoaluminum, monoacetylacetonatobis(ethylacetonato)aluminum, monoethylacetoacetatobis(acetylacetonato)aluminum, tris(isopropylate)aluminum, tris(sec-butylate)aluminum, diisopropylatemono-sec-butoxyaluminum, tris(benzylacetonato)aluminum, etc.; titanium chelate compounds such as diisopropoxybis(ethylacetoacetato) titanate, diisopropoxybis(acetoacetato)titanate, bis(acetylacetonato)oxytitanate, diisopropoxybis(acetylacetonato)titanate, etc.; and zirconium chelate compounds such as tetrakis(acetylacetonato)zirconium, tetrakis(n-propylacetoacetato)zirconium, tetrakis(acetylacetonato) zirconium, tetrakis(ethylacetoacetato) zirconium, and the like.

As the chelate compound to be used as the crosslinking agent in the present invention, the aluminum chelate compound, zirconium chelate compound and titanium chelate compound can be used either singly or in combination.

The amount of the chelate compound used as the crosslinking agent in the composition of the present invention is 0.1 to 10 parts by weight, preferably 0.1 to 5 parts by weight, per 100 parts by weight of the resin component [A] (calculated as solids).

The aqueous curable resin composition of the present invention may contain an organic solvent when necessary, in addition to the components [A] and [B] and water, and may further contain coloring pigments, extender pigments, rust preventing pigments, dyes, leveling agents, antifoaming agents, antisagging agents, and other additives.

The aqueous curable resin composition of the present invention can be cured, for example, by heating a solution or dispersion of the curable composition applied to a substrate by a conventional method such as spray coating, brush coating, roller coating, dip coating or the like, at a heating temperature not lower than 80° C., preferably not lower than 100° C., more preferably about 120° to 200° C., for preferably 5 minutes or longer, more preferably about 10 to 30 minutes.

The curing reaction mechanism of the aqueous curable resin composition of the present invention remains to be clarified. However, since the absorption of onium salt disappears in infrared absorption spectrum, it is presumed that the onium salt is thermally decomposed and the hydroxysilyl group, epoxy group and hydroxyl group react with one another to assume a crosslinked structure, in the presence of the metal chelate serving as a catalyst.

The aqueous curable resin composition of the present invention contains an aprotic onium salt in the resin component and can be made aqueous by the function of the onium salt. Further, the composition has an excellent storage stability, since said onium salt does not react with an epoxy or other groups during storage.

In curing of the composition of the present invention, the specific metal chelate compound serves as a catalyst, the hydroxysilyl group, epoxy group and hydroxyl group react with to one another to achieve crosslinking, giving a cured coating. The specific aprotic onium salt in the resin causes Hoffmann decomposition during or after curing of the resin, resulting in the absence of the onium salt. As a result, the water resistance of the cured product is not reduced.

Consequently, the composition of the present invention is an aqueous one, has an excellent storage stability and good curability and is capable of providing a cured product having a high water resistance.

The following Preparation Examples, Examples and Comparative Examples illustrate the present invention in further detail.

PREPARATION EXAMPLE 1

Preparation of polysiloxane macromoner

| | |
|---|---|
| Methyltrimethoxysilane | 2720 g |
| γ-Methacryloxypropyltrimethoxysilane | 256 g |
| Deionized water | 1134 g |
| 60% hydrochloric acid | 2 g |
| Hydroquinone | 1 g |

The mixture of the above ingredients was reacted at 80° C. for 5 hours. The obtained polysiloxane macromonomer was 2000 in the number average molecular weight, and had one vinyl group (polymerizable unsaturated group) and four silanol groups per molecule on the average. The obtained macromonomer was used for preparing copolymers in the following Examples and Comparative Examples.

EXAMPLE 1

| | |
|---|---|
| Polysiloxane macromonomer obtained in Preparation Example 1 | 100 g |
| 3,4-Epoxycyclohexylmethyl methacrylate | 50 g |
| 2-Hydroxyethyl acrylate | 150 g |
| Methyl methacrylate | 620 g |
| Glycidyl methacrylate | 80 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask, and was polymerized to obtain a transparent copolymer solution. The number average molecular weight of the copolymer was about 35000.

Then, 51 g of dimethylaminoethanol and 34 g of acetic acid were added to the obtained copolymer solution, and the mixture was stirred at 70° C. for 5 hours to obtain a resin solution containing a group having an onium salt formed therein.

The resin thus obtained corresponds to the resin (A-1) and contained 0.52 equivalent/kg of the aprotic onium salt-containing group of the formula (1), 1.19 equivalents/kg of hydroxyl group, 0.24 equivalent/kg of epoxy group and 0.18 equivalent/kg of silanol group.

Subsequently, 1 g of tris(acetylacetonato) aluminum was added to the resin solution (100 g as solids), and the mixture was dispersed in deionized water, giving an aqueous curable resin composition of the present invention in the form of an opaque-white emulsion having a solid content of 30% by weight.

EXAMPLE 2

| | |
|---|---|
| γ-Methacryloxypropyltrimethoxysilane | 150 g |
| 3,4-Epoxycyclohexylmethylacrylate | 50 g |
| 2-Hydroxybutyl methacrylate | 150 g |
| Methyl methacrylate | 570 g |
| Glycidyl methacrylate | 80 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask, and was polymerized to obtain a transparent copolymer solution. The number average molecular weight of the copolymer was about 35000.

Then, 51 g of dimethylaminoethanol and 34 g of acetic acid were added to the obtained copolymer solution, and the mixture was stirred at 70° C. for 5 hours to obtain a resin solution containing a resin having an onium salt formed therein.

The above resin corresponds to the resin (A-1) and contained 0.52 equivalent/kg of the aprotic-onium salt-containing group of the formula (1), 0.88 equivalent/kg of hydroxyl group, 0.25 equivalent/kg of epoxy group and 1.66 equivalents/kg of methoxysily group.

Subsequently, 1 g of tetrakis(acetylacetonato) zirconium was added to the resin solution (100 g as solids), and deionized water was added to the mixture, giving an aqueous curable resin composition of the present invention in the form of an opaque-white emulsion having a solid content of 30% by weight.

EXAMPLE 3

| | |
|---|---|
| Polysiloxane macromonomer obtained in Preparation Example 1 | 100 g |
| 2-Hydroxyethyl acrylate | 150 g |
| Methyl methacrylate | 620 g |
| Glycidyl methacrylate | 80 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask, and was polymerized to obtain a transparent copolymer solution. The number average molecular weight of the copolymer was about 35000.

Then, 51 g of dimethylaminoethanol and 34 g of acetic acid were added to the obtained copolymer solution, and the mixture was stirred at 70° C. for 5 hours to obtain a resin solution containing a resin having an onium salt formed therein.

The above resin corresponds to the resin (A-2) and contained 0.54 equivalent/kg of the aprotic onium salt-containing group of the formula (1), 1.25 equivalents/kg of hydroxyl group and 0.19 equivalent/kg of silanol group.

Subsequently, 50 g of the epoxy compound represented by the formula (19) (corresponding to the compound (A-3)) was dissolved in the obtained resin solution (100 g as solids), and 1 g of tris(acetylacetonato)aluminum was added. The mixture was dispersed in deionized water, giving an aqueous curable resin composition of the present invention in the form of an opaque-white emulsion having a solid content of 30% by weight. The resin component of the composition contained 0.18 equivalent/kg of epoxy group.

EXAMPLE 4

| | |
|---|---|
| 2-Hydroxyethyl acrylate | 150 g |
| Methyl methacrylate | 500 g |
| n-Butyl acrylate | 120 g |
| Glycidyl methacrylate | 80 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask and was polymerized to obtain a transparent copolymer solution. The number average molecular weight of the copolymer was about 35000.

Then, 6.9 g of thiodiglycol and 2.6 g of formic acid were added to the obtained copolymer solution, and the mixture was stirred at 70° C. for 5 hours to obtain a resin solution containing a group having an onium salt formed therein.

The above resin corresponds to the resin (A-5) and contained 0.65 equivalent/kg of the aprotic onium salt-containing group of the formula (1) and 1.50 equivalents/kg of hydroxyl group.

Subsequently, 50 g of the compound represented by the formula (25) (corresponding to the compound (A-4)) was dissolved in the obtained resin solution (100 g as solids), and 1 g of bis(acetylacetonato)oxytitanate was added. The mixture was dispersed in deionized water to obtain an aqueous curable resin composition of the present invention in the form of an opaque-white emulsion having a solid content of 30% by weight. The resin component of said composition contains 0.23 equivalent/kg of epoxy group and 0.69 equivalent/kg of methoxysilyl group.

EXAMPLE 5

| 3,4-Epoxycyclohexyl methyl methacrylate | 50 g |
| 2-Hydroxyethyl acrylate | 150 g |
| Methyl methacrylate | 620 g |
| Glycidyl methacrylate | 80 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask and was polymerized to obtain a transparent copolymer solution. The number average molecular weight of the copolymer was about 35000.

Then, 6.9 g of thiodiglycol and 2.6 g of formic acid were added to the obtained copolymer solution, and the mixture was stirred at 70° C. for 5 hours to obtain a resin solution containing a group having an onium salt formed therein.

The obtained resin corresponds to the resin (A-7) and contained 0.61 equivalent/kg of the aprotic onium salt-containing group of the formula (1), 1.42 equivalents/kg of hydroxyl group and 0.29 equivalent/kg of epoxy group.

Subsequently, 50 g of diphenyldimethoxysilane (corresponding to the compound (A-6)) was admixed with the obtained resin solution (100 g as solids), and 1 g of tris-(benzylacetonato)aluminum was added. The mixture was dispersed in deionized water to obtain an aqueous curable resin composition of the present invention in the form of an opaque-white emulsion having a solid content of 30% by weight. The resin component of the composition contained 0.43 equivalent/kg of methoxysilyl group.

EXAMPLE 6

| γ-Methacryloxypropyltrimethoxysilane | 50 g |
| 3,4-Epoxycyclohexylmethylacrylate | 50 g |
| 2-Hydroxyethyl methacrylate | 150 g |
| n-Butyl acrylate | 670 g |
| Glycidyl methacrylate | 80 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask and was polymerized to obtain a transparent copolymer solution. The number average molecular weight of the copolymer was about 35000.

Then, 5.1 g of dimethylaminoethanol and 2.6 g of formic acid were added to the obtained copolymer solution. The mixture was stirred at 70° C. for 5 hours to obtain a resin solution containing a group having an onium salt formed therein.

The obtained resin corresponds to the resin (A-1) and contained 0.56 equivalent/kg of the aprotic onium salt-containing group of the formula (1), 1.28 equivalents/kg of hydroxyl group, 0.27 equivalent/kg of epoxy group and 0.60 equivalent/kg of methoxysily group.

Subsequently, 1 g of tris(acetylacetonato) aluminum was added to the resin solution (100 g as solids), and the mixture was dispersed in deionized water, giving an aqueous curable resin composition of the present invention in the form of an opaque-white emulsion having a solid content of 30% by weight.

EXAMPLE 7

| Polysiloxane macromonomer obtained in Preparation Example 1 | 100 g |
| 3,4-Epoxycyclohexyl methyl methacrylate | 50 g |
| 2-Hydroxyethyl acrylate | 150 g |
| Methyl methacrylate | 620 g |
| Glycidyl methacrylate | 80 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask, and was polymerized to obtain a transparent copolymer solution. The number average molecular weight of the copolymer was about 35000.

Then, 2.1 g of hydrochloric acid were further added to the obtained copolymer solution and subjected to addition reaction, 45 g of pyridine was added, and the mixture was reacted at 110° C. for 15 hours to obtain a resin solution.

The obtained resin corresponds to the resin (A-1) and contained 0.53 equivalent/kg of a group producing the aprotic onium salt-containing group of the formula (1), 1.23 equivalents/kg of hydroxyl group and 0.25 equivalent/kg of epoxy group and 0.19 equivalent/kg of silanol group.

Subsequently, deionized water was added to the obtained resin solution (100 g as solids), the obtained mixture was treated with an anion exchange resin to remove the chloro ions and neutralized to form an onium salt by addition of 2.6 g of formic acid. One gram of tris(benzylacetonato) aluminum was added, and the mixture was dispersed in deionized water, giving an aqueous curable resin composition of the present invention in the form of an opaque-white emulsion having a solid content of 30% by weight.

EXAMPLE 8

| 2-Hydroxyethyl acrylate | 150 g |
| Methyl methacrylate | 620 g |
| Glycidyl methacrylate | 80 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask and was polymerized to obtain a transparent copolymer solution. The number average molecular weight of the copolymer was about 35000.

Then, 5.1 g of dimethylaminoethanol and 2.6 g of formic acid were added to the obtained copolymer solution, and the mixture was stirred at 70° C. for 5 hours to obtain a resin solution containing a group having an onium salt formed therein.

The obtained resin corresponds to the resin (A-5) and contained 0.65 equivalent/kg of the aprotic onium salt-containing group of the formula (1) and 1.50 equivalents/kg of hydroxyl group.

Subsequently, 100 g of the polysiloxane macromonomer obtained in Preparation Example 1 (corresponding to the compound (A-6)), 50 g of the epoxy compound represented by the formula (19) (corresponding to the compound (A-3)) and 1 g of tris(acetylacetonato) aluminum were added to the obtained resin solution (100 g as solids). The obtained mixture was dispersed in deionized water, giving an aqueous curable resin composition of the present invention in the form of an opaque-white emulsion having a solid content of 30% by weight. The resin component of the composition contained 0.20 equivalent/kg of epoxy group and 0.20 equivalent/kg of silanol group.

EXAMPLE 9

| | |
|---|---|
| Polysiloxane macromonomer obtained in Preparation Example 1 | 100 g |
| 3,4-Epoxycyclohexylmethyl methacrylate | 50 g |
| 2-Hydroxyethyl acrylate | 150 g |
| Methyl methacrylate | 612 g |
| β-Methylglycidyl methacrylate | 88 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask and was polymerized to obtain a transparent copolymer solution. The number average molecular weight of the copolymer was about 32000.

Then, 51 g of dimethylaminoethanol and 34 g of acetic acid were added to the obtained copolymer solution, and the mixture was stirred at 70° C. for 5 hours to obtain a resin solution containing a group having an onium salt formed therein.

The obtained resin corresponds to the resin (A-1) and contained 0.52 equivalent/kg of the aprotic onium salt-containing group of the formula (1), 1.19 equivalents/kg of hydroxyl group, 0.24 equivalent/kg of epoxy group and 0.18 equivalent/kg of silanol group.

Subsequently, 1 g of tris(acetylacetonato) aluminum were added to the obtained resin solution (100 g as solids). The obtained mixture was dispersed in deionized water, giving an aqueous curable resin composition of the present invention in the form of an opaque-white emulsion having a solid content of 30% by weight.

Comparative Example 1

| | |
|---|---|
| Polysiloxane macromonomer obtained in Preparation Example 1 | 100 g |
| 3,4-Epoxycyclohexylmethyl methacrylate | 50 g |
| 2-Hydroxyethyl acrylate | 150 g |
| Methyl methacrylate | 650 g |
| Acrylic acid | 50 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask and was polymerized. However, the contents of the flask gelled one hour after the completion of the dropwise addition.

Comparative Example 2

| | |
|---|---|
| Polysiloxane macromonomer obtained in Preparation Example 1 | 100 g |
| 3,4-Epoxycyclohexylmethyl methacrylate | 50 g |
| 2-Hydroxyethyl acrylate | 150 g |
| Methyl methacrylate | 600 g |
| N,N-Dimethylaminoethyl acrylate | 100 g |
| 2,2'-Azobisisobutylonitrile | 30 g |

The mixture of the above ingredients was added dropwise to 1000 g of ethylene glycol monobutyl ether maintained at 120° C. in a 5-liter four-necked flask and was polymerized to obtain a transparent resin solution. The number average molecular weight of the resin was about 23000.

Subsequently, the obtained resin solution was neutralized with acetic acid, and 1 g of tris(acetylacetonato)aluminum was added to the neutralized resin solution (100 g as solids). The mixture was dispersed in deionized water, giving a comparative aqueous curable resin composition in the form of an opaque-white emulsion having a solid content of 30% by weight.

Comparative Example 3

| | |
|---|---|
| Polysiloxane macromonomer obtained in Preparation Example 1 | 100 g |
| 3,4-Epoxycyclohexylmethyl methacrylate | 50 g |
| 2-Hydroxyethyl acrylate | 150 g |
| Methyl methacrylate | 10 g |
| RMH-1053 (product of Nippon Nyukazai Co., Ltd., a macromonomer having a polyethylene oxide chain) | 600 g |
| 2,2'-Azobisisobutylonitrile | 40 g |

The mixture of the above ingredients was added dropwise to 1000 g of ethylene glycol monobutyl ether maintained at 120° C. in a 5-liter four-necked flask and was polymerized to obtain a transparent resin solution. The number average molecular weight of the resin was about 42000.

Subsequently, 1 g of tris(acetylacetonato)aluminum was added to the obtained resin solution (100 g as solids). The mixture was dispersed in deionized water, giving a comparative aqueous curable resin composition in the form of an opaque-white emulsion having a solid content of 30% by weight.

Comparative Example 4

An aqueous resin composition was prepared in the same manner as in Example 1 except that tris(acetylacetonato)aluminum was not added.

The emulsion particle sizes of the resin compositions obtained in Examples 1 to 9 and Comparative Examples 1 to 4 was measured, and coating films formed from these compositions were tested for gel fraction ratio, water resistance and xylol resistance. The test methods are as follows.

Emulsion Particle Size

Determined by a Coulter counter model N4 manufactured by Coulter Co., Ltd.

Gel Fraction Ratio

Each of the compositions of Examples and Comparative Examples was applied to a tinplate with an applicator to a dry thickness of 100 μm and heated at 130° C. for 30 minutes for curing. The obtained test plate was immersed in a boiling acetone for 6 hours. The gel fraction ratio was determined by the decrease in the weight of the cured coating after 6-hour immersion.

Water Resistance

A test plate prepared in the same manner as for the gel fraction ratio test was immersed in water at 20° C. for a week and the condition of the cured coating was visually evaluated according to the following criteria.

A: The coating was in good condition without undesirable changes such as blistering and peeling.

B: The coating was in bad condition with blistering or peeling all over the surface.

Xylol Resistance

The coating was strongly rubbed with gauze wet with xylol by 10 strokes over the length of 5 cm under the pressure of about 4 kg/cm². The degree of dissolution of the coating was visually inspected and evaluated according to the following criteria.

A: The coating was substantially free from mar or dissolution.

B: The coating was significantly dissolved and in a bad condition.

The test results are shown in Table 1.

TABLE 1

|  | Emulsion particle size | Gel fraction ratio | Water resistance | Xylol resistance |
|---|---|---|---|---|
| Ex. 1 | 275 nm | 92% | A | A |
| Ex. 2 | 280 nm | 94% | A | A |
| Ex. 3 | 290 nm | 93% | A | A |
| Ex. 4 | 300 nm | 90% | A | A |
| Ex. 5 | 230 nm | 95% | A | A |
| Ex. 6 | 250 nm | 98% | A | A |
| Ex. 7 | 280 nm | 96% | A | A |
| Ex. 8 | 320 nm | 91% | A | A |
| Ex. 9 | 270 nm | 93% | A | A |
| Comp. Ex. 1 | Gelled | — | — | — |
| Comp. Ex. 2 | 350 nm | 5% | B | B |
| Comp. Ex. 3 | 500 nm | 80% | B | A |
| Comp. Ex. 4 | 275 nm | 15% | B | B |

We claim:

1. An aqueous curable resin composition which comprises:

[A] a resin component having, as functional groups, an aprotic onium salt-containing group represented by the formula (1)

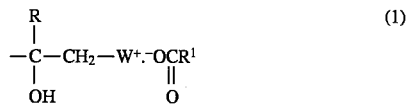

wherein R is a hydrogen atom or a methyl group, $R^1$ is a hydrogen atom or a hydrocarbon group having 1 to 8 carbon atoms which may be substituted by a hydroxyl group, an alkoxyl group, an ester group or a halogen atom, $W^+$ represents

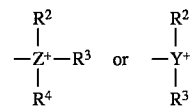

wherein Z is a nitrogen atom or a phosphorus atom, Y is a sulfur atom and $R^2$, $R^3$ and $R^4$ are the same or different and each represents an organic group having 1 to 14 carbon atoms, or $R^2$ and $R^3$, or $R^2$, $R^3$ and $R^4$ may combine to form a heterocyclic group together with the nitrogen atom, the phosphorus atom or the sulfur atom, a hydroxyl group, an alicyclic epoxy group and a hydrolyzable group directly bound to a silicon atom or a hydroxysilyl group, and

[B] a metal chelate compound selected from the class consisting of aluminum chelate compound, zirconium chelate compound and titanium chelate compound.

2. An aqueous curable resin composition according to claim 1 wherein the resin component [A] is a resin (A-I) having in a molecule the aprotic onium salt-containing group represented by the formula (1), a hydroxyl group, an alicyclic epoxy group and a hydrolyzable group directly bound to a silicon atom or a hydroxysilyl group.

3. An aqueous curable resin composition according to claim 1 wherein the resin component [A] is a mixture of a resin or a compound (A-2) having in a molecule a hydroxyl group and a hydrolyzable group directly bound to a silicon atom or a hydroxysilyl group and a resin or a compound (A-3) having an alicyclic epoxy group in a molecule, at least one of (A-2) and (A-3) being a resin or a compound having the aprotic onium salt-containing group represented by the formula (1).

4. An aqueous curable resin composition according to claim 1 wherein the resin component [A] is a mixture of a resin or a compound (A-4) having in a molecule an alicyclic epoxy group and a hydrolyzable group directly bound to a silicon atom or a hydroxysilyl group and a resin or a compound (A-5) having a hydroxyl group in a molecule, at least one of (A-4) and (A-5) being a resin or a compound having the aprotic onium salt-containing group represented by the formula (1).

5. An aqueous curable resin composition according to claim 1 wherein the resin component [A] is a mixture of a resin or a compound (A-6) having in a molecule a hydrolyzable group directly bound to a silicon atom or a hydroxysilyl group and a resin or a compound (A-7) having in a molecule a hydroxyl group and an alicyclic epoxy group, at least one of (A-6) and (A-7) being a resin or a compound having the aprotic onium salt-containing group represented by the formula (1).

6. An aqueous curable resin composition according to claim 1 wherein the resin component [A] is a mixture of a resin or a compound (A-6) having in a molecule a hydrolyzable group directly bound to a silicon atom or a hydroxysilyl group, a resin or a compound (A-3) having an alicyclic epoxy group in a molecule and a resin or a compound (A-5) having a hydroxyl group in a molecule, at least one of (A-6), (A-3) and (A-5) being a resin or a compound having the aprotic onium salt-containing group represented by the formula (1).

7. An aqueous curable resin composition according to claim 1 which contains, per kilogram of the resin component [A], 0.01 to 3.0 equivalents of the aprotic onium salt-containing group represented by the formula (1), 0.1 to 8.0 equivalents of hydroxyl group, 0.1 to 5.0 equivalents of an alicyclic epoxy group and 0.1 to 10 equivalents of hydrolyzable group directly bound to a silicon atom or hydroxysilyl group.

8. An aqueous curable resin composition according to claim 7 which contains, per kilogram of the resin component [A], 0.1 to 1.5 equivalents of the aprotic onium salt-containing group represented by the formula (1), 0.5 to 2.5 equivalents of hydroxyl group, 0.5 to 2.5 equivalents of an alicyclic epoxy group, and 0.1 to 1.0 equivalent of hydrolyzable group directly bound to a silicon atom or hydroxysilyl group.

9. An aqueous curable resin composition according to any one of claims 1 to 8 wherein the aprotic onium salt-containing group represented by the formula (1) in the resin component [A] is a group prepared by reacting 1,2-epoxy group with tertiary amine, phosphine or thioether and an organic acid.

10. An aqueous curable resin composition according to claim 1 which comprises 0.1 to 10 parts by weight of the metal chelate compound [B] per 100 parts by weight of the resin component [A], calculated as solids.

11. A method for forming a cured coating which comprises the steps of applying to a substrate the aqueous curable resin composition according to claim 1 and heating the coating at a temperature of 120° to 200° C. for curing.

* * * * *